(12) United States Patent
Chen

(10) Patent No.: US 9,241,150 B2
(45) Date of Patent: Jan. 19, 2016

(54) THREE-DIMENSIONAL IMAGE CAPTURE APPARATUS

(75) Inventor: Yen-Chun Chen, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 994 days.

(21) Appl. No.: 13/292,101

(22) Filed: Nov. 9, 2011

(65) Prior Publication Data
US 2012/0236123 A1    Sep. 20, 2012

(51) Int. Cl.
*H04N 13/02*  (2006.01)

(52) U.S. Cl.
CPC .................................. *H04N 13/0239* (2013.01)

(58) Field of Classification Search
CPC ...... G02B 27/145; G02B 5/04; G02B 27/141; G02B 27/283; H04N 13/0239
See application file for complete search history.

(56) References Cited

U.S. PATENT DOCUMENTS

| | | | |
|---|---|---|---|
| 5,191,408 A * | 3/1993 | Takanashi et al. | 348/207.99 |
| 7,567,271 B2 * | 7/2009 | Berestov | 348/48 |
| 2003/0048416 A1 | 3/2003 | Meltzer | |
| 2003/0160881 A1 * | 8/2003 | Roddy et al. | 348/272 |
| 2006/0146340 A1 * | 7/2006 | Szwaykowski et al. | 356/495 |
| 2007/0201342 A1 * | 8/2007 | Molitor et al. | 369/112.28 |
| 2007/0273796 A1 * | 11/2007 | Silverstein et al. | 348/752 |
| 2010/0128109 A1 * | 5/2010 | Banks | 348/46 |
| 2010/0328780 A1 * | 12/2010 | Tocci | 359/636 |
| 2011/0043712 A1 * | 2/2011 | Yamakawa | 349/9 |
| 2011/0261456 A1 * | 10/2011 | Raab | 359/489.08 |
| 2011/0292402 A1 * | 12/2011 | Awatsuji et al. | 356/495 |
| 2011/0315863 A1 * | 12/2011 | Yu et al. | 250/229 |
| 2012/0105594 A1 * | 5/2012 | You et al. | 348/49 |
| 2012/0224034 A1 * | 9/2012 | Kalkbrenner et al. | 348/49 |
| 2013/0342657 A1 * | 12/2013 | Robertson | 348/47 |

FOREIGN PATENT DOCUMENTS

| | | |
|---|---|---|
| CN | 2539203 Y | 3/2003 |
| CN | 101588512 A | 11/2009 |
| TW | 509817 B | 11/2002 |
| TW | 542946 B | 7/2003 |

* cited by examiner

*Primary Examiner* — Christopher S Kelley
*Assistant Examiner* — Deirdre Beasley
(74) *Attorney, Agent, or Firm* — Novak Druce Connolly Bove + Quigg LLP

(57) ABSTRACT

A three-dimensional image capture apparatus includes a single lens module, an X-cube beam-splitting prism, two image sensors and a parallax processor. The beam-splitting prism includes a first transflective surface and a second transflective obliquely intersecting the first transflective surface. The first transflective surface is configured for reflecting light from a first viewing angle of an object through the lens module toward a first direction. The second transflective surface is configured for reflecting light from a second viewing angle of an object through the lens module toward an opposite second direction. The image sensors are configured for respectively detecting the light reflected by the first and second transflective surfaces, and generating parallax image signals. The parallax processor is configured for processing the parallax image signals from the image sensors to generate a 3D image.

7 Claims, 4 Drawing Sheets

THREE-DIMENSIONAL IMAGE CAPTURE APPARATUS

BACKGROUND

1. Technical Field

The present disclosure relates generally to a three-dimensional (3D) image capture apparatus.

2. Description of Related Art

Currently, image capture apparatuses have become widely used in a variety of consumer electronic devices, such as notebook computers, personal digital assistants, cellular telephones, etc. In the meantime, there is an increasing demand for improving image quality, which essentially depends on the quality of the lens module of the image capture apparatus. That is, a lens module with high image quality is desired.

A typical 3D image capture apparatus includes two lens modules, two image sensors, and a parallax processor. The two lens modules are horizontally arranged, simulating two eyes of human being, and simultaneously capture parallax images of an object. The images captured by the two lens modules are then respectively detected by the two image sensors. Finally the parallax images detected by the two image sensors are synthesized by the parallax processor, thereby forming 3D images. However, the two lens modules may increase the volume and cost of the 3D image capture apparatus.

Therefore, there is a need for a 3D image capture apparatus with a single lens module, to overcome the above mentioned limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
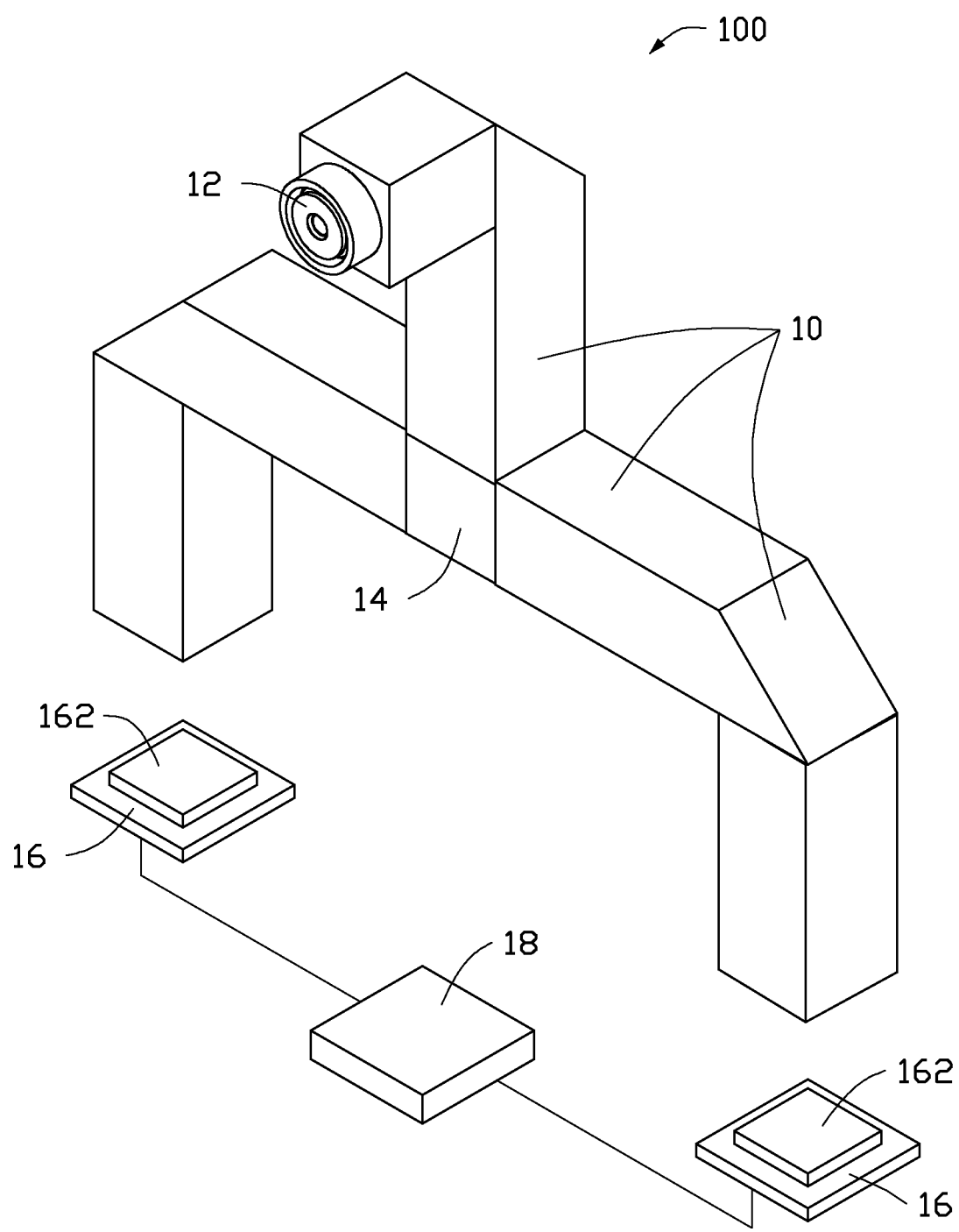
FIG. 1 is a schematic, isometric view of a 3D image capture apparatus according to a first exemplary embodiment.

Referring to FIG. 1, a 3D image capture apparatus 100 according to a first exemplary embodiment includes a light guiding system 10, a lens module 12, a beam-splitting prism 14, two image sensors 16 and a parallax processor 18.

The light guiding system 10 includes a first light guiding pipe 102, a second light guiding pipe 104, two third light guiding pipes 106, two fourth light guiding pipes 108, a first mirror 110, and two second mirrors 112. One end of the first light guiding pipe 102 is connected to one end of the second light guiding pipe 104. The first light guiding pipe 102 extends perpendicularly to and is in communication with the second light guiding pipe 104. The other end of the second light guiding pipe 104 is connected to one end of each third light guiding pipe 106. The two third light guiding pipes 106 extend perpendicularly to and are in communication with the second light guiding pipe 104. The two third light guiding pipes 106 extend opposite to each other from the end of the second light guiding pipe 104. The other ends of the two third light guiding pipes 106 are respectively connected to one end of each fourth light guiding pipe 108. The fourth light guiding pipes 108 extend perpendicularly to and are in communication with the corresponding third guiding pipes 106. In this embodiment, the fourth light guiding pipes 108 extend parallel with each other, and are arranged at a same side of the third light guiding pipes 106. The fourth light guiding pipes 108 each define an opening at the other end thereof.

The lens module 12 focus ambient light and transmits the light to the light guiding system 10. The lens module 12 is positioned in the first light guiding pipe 102. The lens module 12 has a light incident opening at an open end of the first light guiding pipe 102 away from the second light guiding pipe 104. The lens module 12 has an optical axis parallel with the extension axis of the first light guiding pipe 102.

The first mirror 110 is in the light path of the 3D image capture apparatus 100 at a first intersection of the first light guiding pipe 102 and the second light guiding pipe 104, guiding the light transmitting from the first light guiding pipe 102 to the second light guiding pipe 104. The first intersection includes a first slanted inner surface 101. The first mirror 110 contacts the first slanted inner surface 101. In this embodiment, the first mirror 110 has a first reflecting surface 110a inclined about 45 degrees with respect to both of the extension axes of the first light guiding pipe 102 and the second light guiding pipe 104. The second mirrors 112 are respectively in the light path of the 3D image capture apparatus 100 at two second intersections of the third light guiding pipes 106 and the corresponding fourth light guiding pipes 108, guiding the light transmitting from the third light guiding pipes 106 to the corresponding fourth light guiding pipes 108. Each second intersection includes a second slanted inner surface 103. The second mirror 110 contacts the corresponding second slanted inner surface 103. In this embodiment, the second mirror 112 has a second reflecting surface 112a inclined about 45 degrees with respect to both of the extension axes of the corresponding third light guiding pipe 106 and the corresponding fourth light guiding pipe 108.

The beam-splitting prism 14 is located in a boundary among the second light guiding pipe 104 and the two third light guiding pipes 106. The beam-splitting prism 14 is cuboid-shaped, and includes two transflective surfaces 142 intersected each other, thereby forming an X-shaped structure. The transflective surfaces 142 have both of a reflective property and a transmitting property. The intersection of the two transflective surfaces 142 is perpendicular to the extension axis of the second light guiding pipe 104, and is also perpendicular to the extension axes of the third light guiding pipes 106. The transflective surfaces 142 are slanted to each other. That is, the transflective surfaces 142 are not perpendicular or parallel with each other. The inclined angles between the extension axis of the second light guiding pipe 104 and the transflective surfaces 142 are same. In this embodiment, the sum of the inclined angles between the extension axis of the second light guiding pipe 104 and the transflective surfaces 142 is greater than 90 degrees. The beam-splitting prism 14 can be formed by adhering four triangular prisms together. The interfaces between each two adjacent triangular prisms form the transflective surfaces 142.

The image sensors 16 are respectively located at the openings of the fourth light guiding pipes 108. Each of the image sensors 16 has a sensing surface 162 facing the corresponding second mirror 112 for detecting light reflected by the corresponding second mirror 112. The sensing surface 162 is perpendicular to the extension axis of the fourth light guiding pipe 108. The image sensors 16 each detects the light reflected by the corresponding second mirror 112 and generates a 2D image signal.

The parallax processor 18 is electrically connected to the image sensors 16. The parallax processor 18 receives and processes the image signals, thereby generating a 3D image signal.

Figure 2:
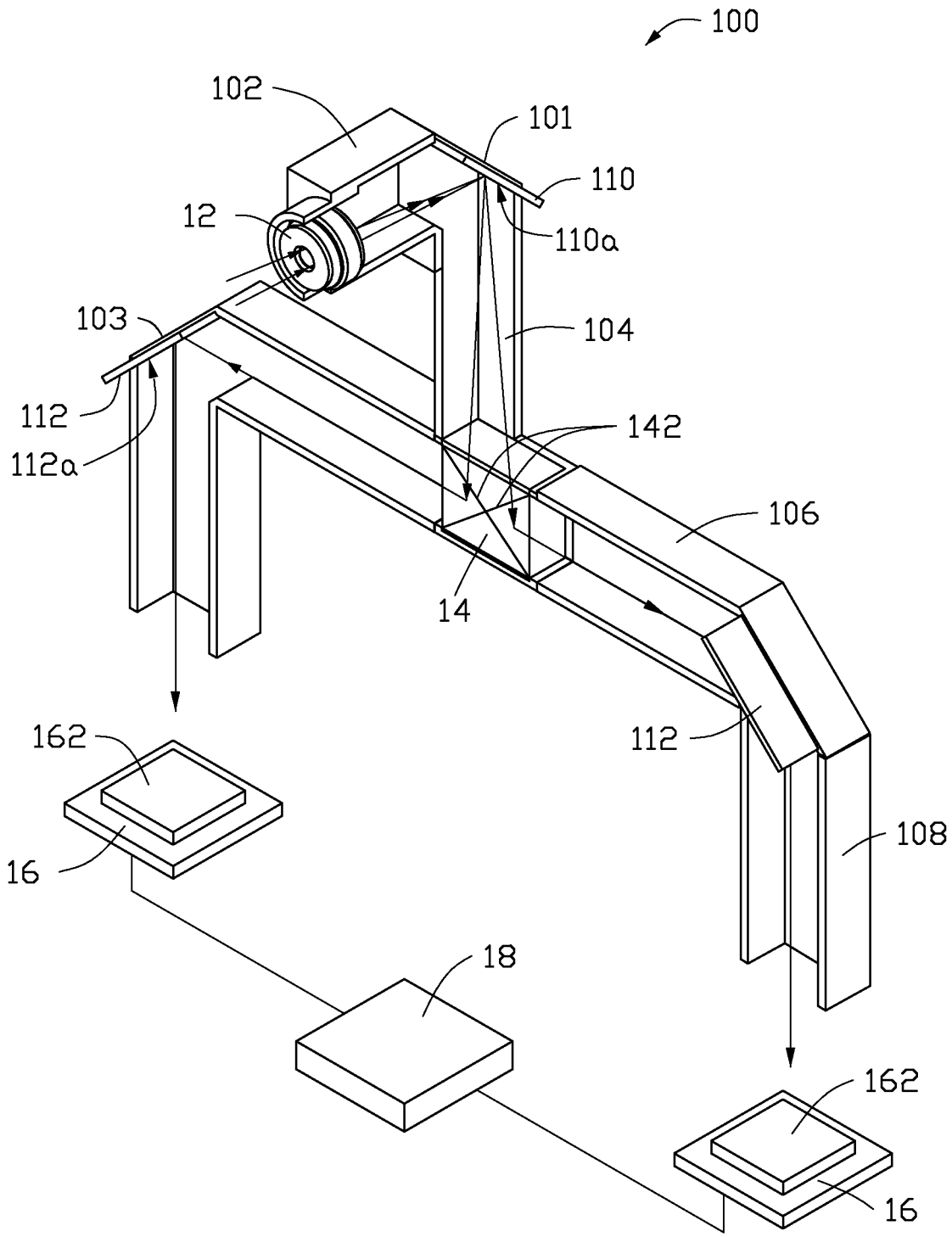
FIG. 2 is similar to FIG. 1, but showing a light path of the 3D image capture apparatus of FIG. 1.

Referring to FIG. 2, the light path in the 3D image capture apparatus 100 is described as follows. The ambient light enters into lens module 12 from the open end of the first light guiding pipe 102. Then, the light exits from the lens module 12 and attacks on the first mirror 110. The first mirror 110 reflects the light into the second light guiding pipe 104, and then the light enters into the beam-splitting prism 14. Furthermore, part of the light is reflected by the one of the transflective surfaces 142 of the beam-splitting prism 14 to one of the second mirror 112, and another part of the light is reflected by the other transflective surface 142 to the other second mirror 112. The two second mirrors 112 each reflects the light to the corresponding fourth light guiding pipe 108, and finally the light transmitting in the corresponding fourth light guiding pipe 108 attacks on the sensing surface 162 of the corresponding image sensor 16. Because the two transflective surfaces 142 are slanted to each other, the light capable of attacking on the two second mirrors 112 is from two viewing angles of the lens module 12 (equivalent to light viewed by left and right eyes). That is, the image signals received by the parallax processor 18 from the two image sensors 16 are parallax image signals. The parallax processor 18 synthesizes the two parallax images to form a 3D image.

In the light path from the lens module 12 to the image sensors 16, the light is successively reflected by the first mirror 110, the transflective surface 142 of the beam-splitting prism 14, and the second mirror 112. In other words, the light is reflected by three times (i.e. odd number of times). Thus, the images detected by the image sensors 16 are mirror images of the captured object. That is, the images detected by the image sensors 16 need to be mirrored before synthesized by the parallax processor 18.

In this embodiment, the beam-splitting prism 14 is applied to split the light, thereby forming parallax images for a 3D image. Therefore, just one lens module 12 is used. Thus, the volume and cost of the 3D image capture apparatus 100 are reduced.

In an alternative embodiment, the transflective surfaces 142 of the beam-splitting prism 14 can also be perpendicular to each other. In that case, the extension axis of each third light guiding pipe 106 should be inclined to the corresponding transflective surface 142.

Figure 3:
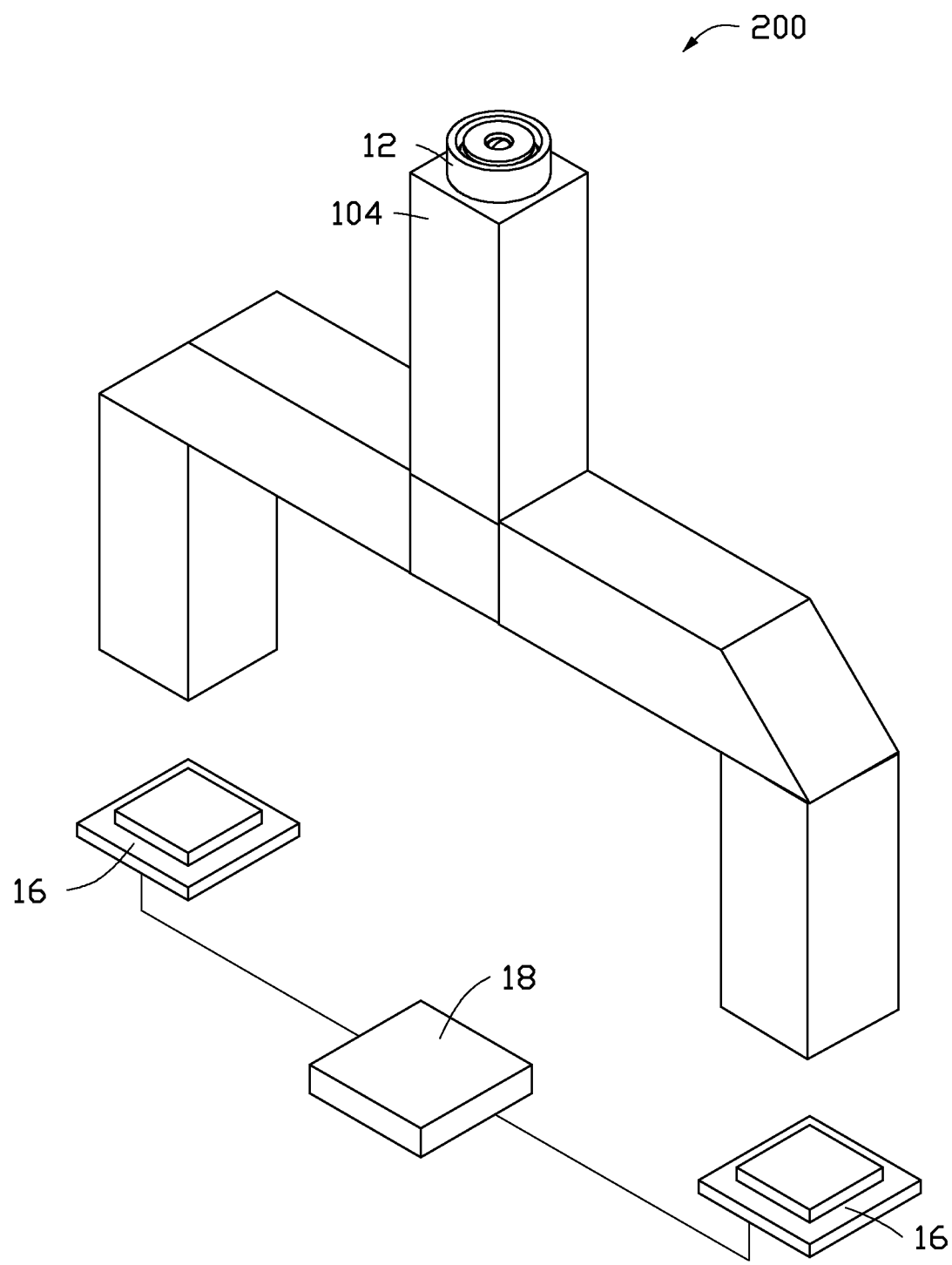
FIG. 3 is a schematic, isometric view of a 3D image capture apparatus according to a second exemplary embodiment.

Referring to FIG. 3, a 3D image capture apparatus 200 according to a second exemplary embodiment is similar as the 3D image capture apparatus 100. The distinguishing features are that the first light guiding pipe 102 and the first mirror 110 are omitted, and the lens module 12 is located in the second light guiding pipe 104. In the light path from the lens module 12 to the image sensors 16, the light is reflected by two times (i.e. even times). Thus, there is no need to mirror the images detected by the image sensors 16 before synthesized by the parallax processor 18.

Figure 4:
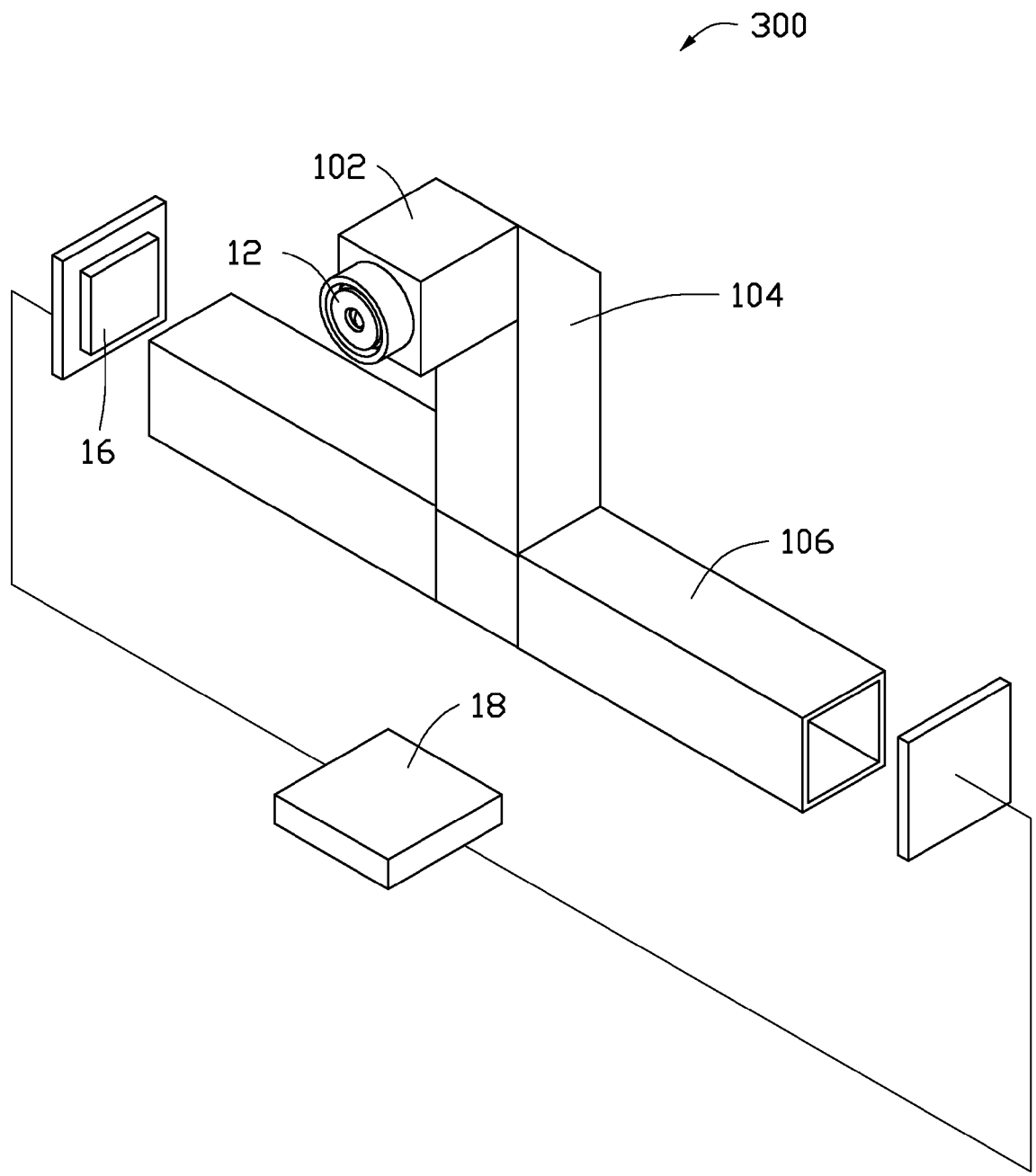
FIG. 4 is a schematic, isometric view of a 3D image capture apparatus according to a third exemplary embodiment.

Referring to FIG. 4, a 3D image capture apparatus 300 according to a second exemplary embodiment is similar as the 3D image capture apparatus 100. The distinguishing features are that the third light guiding pipe 108 and the second mirror 112 are omitted, and the two image sensors 16 are located at the opening of the corresponding third light guiding pipes 106. The sensing surfaces 162 are perpendicular to the extension axis of the corresponding third light guiding pipe 106. In the light path from the lens module 12 to the image sensors 16, the light is reflected by two times (i.e. even times). Thus, there is no need to mirror the images detected by the image sensors 16 before synthesized by the parallax processor 18.

In an alternative embodiment, the first light guiding pipe 102 and the fourth light guiding pipes 108 in the first exemplary embodiment can also be both omitted. In that case, the images detected by the image sensors 16 need to be mirrored before synthesized by the parallax processor 18.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A three-dimensional image capture apparatus, comprising:

a single lens module;

a first light guiding pipe, the lens module located in the first light guiding pipe, the first light guiding pipe extending parallel to an optical axis of the lens module;

a second light guiding pipe, one end of the second light guiding pipe perpendicularly connected to one end of the first light guiding pipe and in communication with the first light guiding pipe, the second light guiding pipe extending perpendicularly to the first light guiding pipe;

a first mirror located at a first intersection of the first light guiding pipe and the second light guiding pipe, the first intersection comprising a first slanted inner surface, the first mirror contacting the first slanted inner surface;

an X-cube beam-splitting prism comprising a first transflective surface and a second transflective obliquely intersecting the first transflective surface, the first transflective surface being configured for reflecting light from a first viewing angle of an object through the lens module toward a first direction, the second transflective surface being configured for reflecting light from a second viewing angle of an object through the lens module to toward an opposite second direction;

two image sensors for respectively detecting the light reflected by the first and second transflective surfaces, and generating parallax image signals; and a parallax processor for processing the parallax image signals from the image sensors to generate a 3D image;

wherein the first mirror has a reflective surface inclined about 45 degrees with respect to the extension axes of the first light guiding pipe and the second light guiding pipe for reflecting the light from the first light guiding pipe to the second light guiding pipe, the beam-splitting prism is located at an end of the second light guiding pipe away from the first mirror, the first and second transflective surfaces being inclined a same angle with respect to the extension axis of the second light guiding pipe, the apparatus further comprises two third light guiding pipes, the two third light guiding pipes extend perpendicularly to and are in communication with the second light guiding pipe, the two third light guiding pipes extend opposite to each other from the end of the second light guiding pipe, the beam-splitting prism is located in a boundary among the second light guiding pipe and the two third light guiding pipes, the third light guiding pipes respectively guide the light reflected by the first and second transflective surfaces, the two third light guiding pipes are not parallel to the first light guiding pipe; and wherein the apparatus further comprises two fourth light guiding pipes and two second mirrors, the fourth light guiding pipes are respectively perpendicularly connected to the third light guiding pipes and in communication with the third light guiding pipes, each of the second mirrors being located at a second intersection of the corresponding third light guiding pipe and the corresponding fourth light guiding pipe for reflecting the light from the corresponding third light guiding pipe to the corresponding fourth light guiding pipe.

2. The apparatus of claim 1, further comprising two third light guiding pipes, the beam-splitting prism sandwiched between the third light guiding pipes, the third light guiding pipes being for respectively guiding the light reflected by the first and second transflective surfaces.

3. The apparatus of claim 2, wherein the two image sensors are arranged at opposite sides of the third light guiding pipes and face toward each other.

4. The apparatus of claim 2, further comprising two fourth light guiding pipes and two second mirrors, the fourth light guiding pipes being respectively connected to the third light guiding pipes and in communication with the third light guiding pipes, each of the second mirrors being located at a second intersection of the corresponding third light guiding pipe and the corresponding fourth light guiding pipe for reflecting the light from the corresponding third light guiding pipe to the corresponding fourth light guiding pipe, the second mirrors being inclined about 45 degrees with respect to the corresponding third light guiding pipe and the corresponding fourth light guiding pipe, the two image sensors being respectively arranged in the fourth light guiding pipes and face toward a same direction.

5. The apparatus of claim 1, wherein the second intersection comprises a second slanted inner surface, and the second mirror contacts the second slanted inner surface.

6. The apparatus of claim 1, wherein each second mirror is inclined about 45 degrees with respect to the corresponding third light guiding pipe and the corresponding fourth light guiding pipe, and the two image sensors are respectively located at the openings of the fourth light guiding pipes and face toward the second mirrors.

7. The apparatus of claim 4, wherein the second intersection comprises a second slanted inner surface, and the second mirror contacts the second slanted inner surface.

\* \* \* \* \*